April 17, 1928.
H. A. SHUMAN
HELICOPTER
Filed Nov. 16, 1925
1,666,315
2 Sheets-Sheet 1
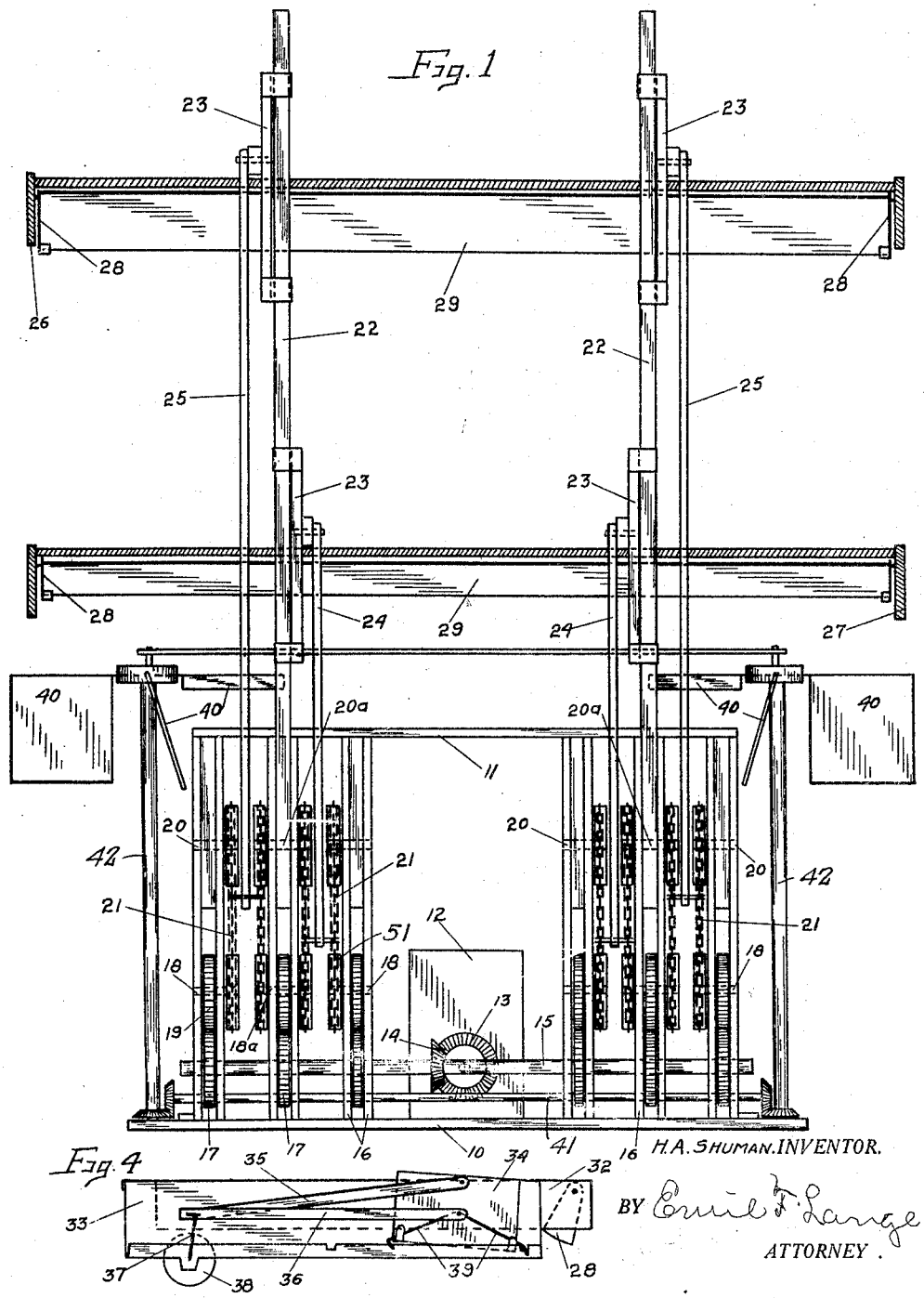

April 17, 1928.
H. A. SHUMAN
1,666,315
HELICOPTER
Filed Nov. 16, 1925
2 Sheets-Sheet 2
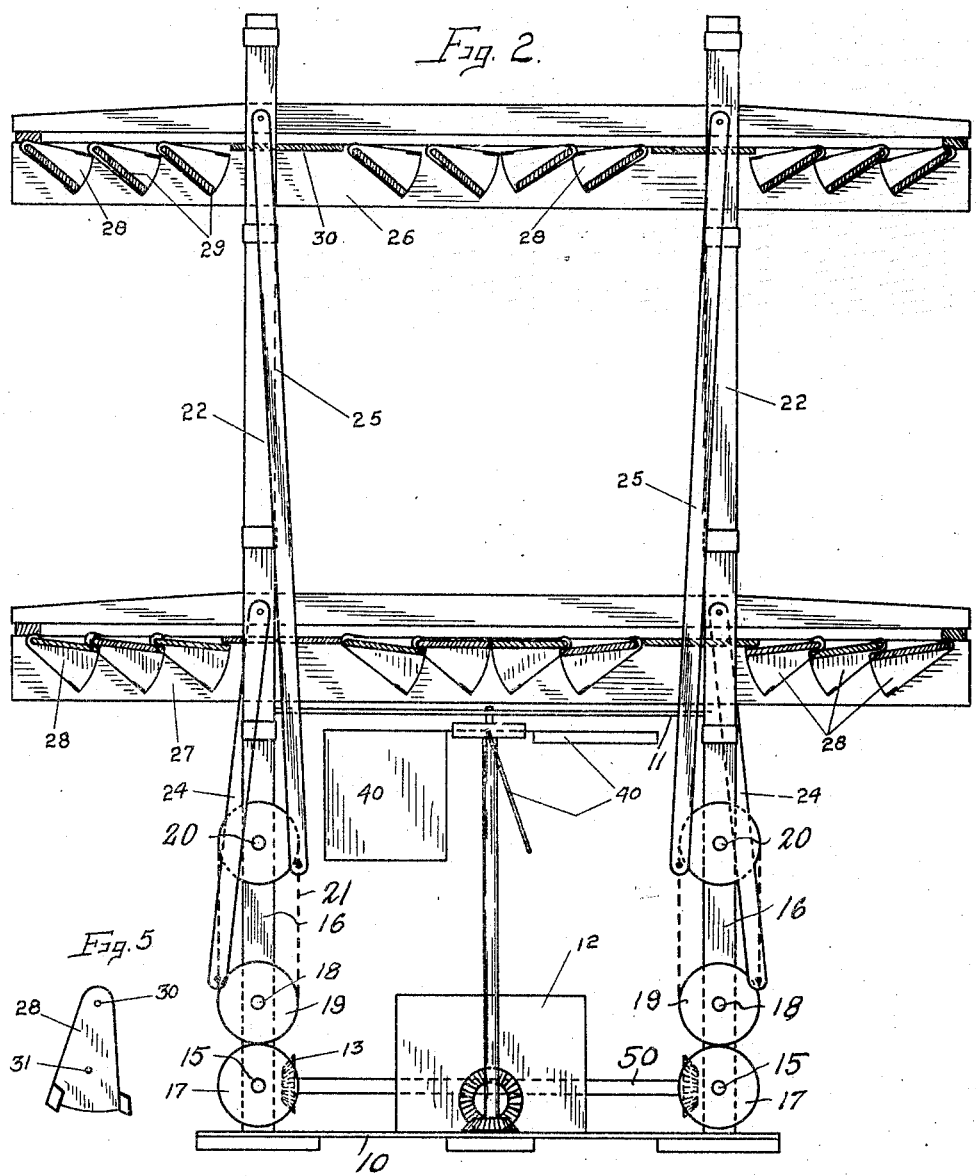
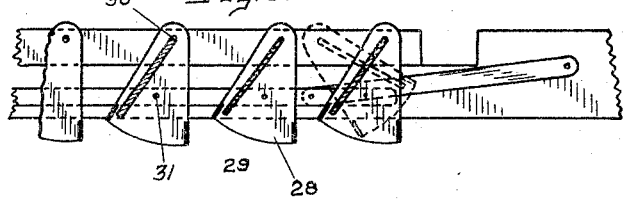
H.A. SHUMAN. INVENTOR.
BY Emil F. Lange
ATTORNEY.

Patented Apr. 17, 1928.

1,666,315

UNITED STATES PATENT OFFICE.

HENRY A. SHUMAN, OF FAIRBURY, NEBRASKA.

HELICOPTER.

Application filed November 16, 1925. Serial No. 69,400.

My invention relates to flying machines of the helicopter type, its primary object being the provision of a helicopter which is caused to rise by the action of two parallel reciprocating planes. Among the other objects of the invention are the provision of valves which permit both horizontal and vertical flight, the provision of improved mechanism for reciprocating the planes and the provision of novel mechanism for actuating the valves to either of two positions and for locking them in position.

Referring now to the drawings,

Figure 1 is a vertical sectional view of the helicopter.

Figure 2 is also a vertical sectional view, the section being at right angles to that of Figure 1.

Figure 3 is a fragmentary view showing the valve shifting arrangement.

Figure 4 is a fragmentary view of the mechanism for causing the shifting and locking of the valves.

Figure 5 is a perspective view of the valve guide.

The cab of the helicopter includes the floor 10 and a roof 11 which are rigidly secured to the uprights so as to form a very firm structure, the cab being designed to support the engine and operating mechanism as well as the passengers and cargo. The engine is shown at 12 and the drive shaft 50 of the engine is provided with a bevel pinion 13 which meshes with the bevel pinion 14 on the shaft 15. Connecting the floor 10 and roof 11 at each corner are three pairs of uprights 16, and the shaft 15 is journalled in all these uprights. The shaft 15 has keyed thereto six spur gears 17, there being one gear 17 between each pair of uprights 16. Each pair of uprights also has journalled therein a shaft 18. The middle shaft 18$^a$ projects outwardly from both uprights but the outer shafts 18 project inwardly only. All of the shafts 18 and 18$^a$ are in alignment and they have secured thereto sprocket wheels 51 on their projecting ends. The sprocket wheels are coaxial but they are spaced so that there are no obstructions between the sprocket wheels in the outer and inner pairs. The shafts 18 and 18$^a$ have secured thereto spur gears 19 meshing with the gears 17. Some distance above the shaft 18 similar shafts 20 and 20$^a$ are journalled in the uprights 16 and these also carry sprocket wheels similar to those on the shafts 18 and 18$^a$. Each sprocket wheel on the shaft 20 and 20$^a$ is connected to its companion sprocket wheel on the shaft 18 and 18$^a$ by means of a sprocket chain 21. It will thus be seen that there are four pairs of sprocket chains on each side of the engine and that they are all driven from the shafts 15 at a uniform rate of speed. It will also be seen that the chains of each pair of chains have a non-obstructed space between them.

Standards 22 are securely anchored between the two uprights 16 of each middle pair of uprights and they project a considerable distance above the roof 11. The planes and sleeves may and should be braced by means of numerous guy wires, but since the system of bracing is not a part of this invention, the guy wires are not shown in the drawings. Slidably secured to each standard 22 is a pair of links 23 on opposite sides of the standard. These links are secured to the standard 22 by means of collars surrounding the standard so that they may slide freely thereon.

The pitman 24 is pivotally connected at its upper end to the slidable link 23 and at its lower end it is secured to each chain of the inner pair of sprocket chains 21. The thickness of the pitman 24 is less than the space between the sprocket chains. A similar but longer pitman 25 is similarly connected to the upper of the slidable links 23 and to the chains of the outer pair of chains. The points of connection of the pitmen 24 and 25 to the respective sprocket chains are such that when one pitman is moving in one direction, the other pitman is moving in the opposite direction.

The helicopter is propelled by means of two horizontally positioned planes 26 and 27 which are connected to the pitmen 25 and 24 respectively. The movement of the pitmen causes the planes 26 and 27 to move simultaneously toward or away from each other, so that while either plane is moving upwardly, the other is moving downwardly. In order to utilize the lifting power of the air by means of the reciprocation of the planes, each plane is provided with a valve arrangement. The valve arrangement of the two planes is identical.

On two of the opposite sides of each plane is a plurality of valve guides similar to that shown in Figure 5 and between each pair of oppositely positioned valve guides there is a valve 29. The valves 29 are pivoted to swing freely between the limits of the valve guides. They extend transversely across the entire plane. At the points where the planes engage the standards 22 the valves are omitted but in their place are slats 30 having apertures through which the standards are secured. In each case the valves are on the under side of the plane and in the arrangement as shown in Figure 2 the valves are all directed inwardly so as to maintain the helicopter in equilibrium while rising. By reference to Figure 2 it will be seen that while the upper plane 26 is moving upwardly and the lower plane 27 is moving downwardly, the valves of the upper plane will be held open under the pressure of the air, while the valves of the lower plane will be held closed. On the following stroke when the planes 26 and 27 approach each other the positions of the valves of the two planes will be reversed. The upward movement of either plane is the idle movement, but the downward movement of either plane is against the resistance of the air. It causes the helicopter to rise. The action is in effect a continuous pumping action resulting in the upward displacement of the helicopter with reference to the air.

In order to be serviceable as a flying machine the helicopter must not only be capable of rising vertically but it must also be adapted for horizontal flight. The valve arrangement shown in Figure 2 is such as to facilitate vertical flight by resisting any tendency of the machine to move horizontally. In order to make provision for the horizontal movement of the helicopter, it is only necessary to so arrange the valves that they will all be inclined in the same direction. This arrangement is provided by means of the adjusting mechanism shown in Figure 3. The valve guides 28 are each pivoted at 30 and 31 to two parallel movement levers respectively, so that the valve guides may be moved into either of two positions shown in full and dotted lines respectively in Figure 3. In the one position the valves will be arranged as in the upper plane of Figure 2, but if the adjustment is provided for one set of valves only in each plane, the valves may be arranged so that they will all have the same inclination when open. The mechanism for shifting the parallel movement levers is shown in Figure 4. In this case the valve guides 28 are secured by their pivotal connections 30 to a slidable lever 32 in the rear of the lever 33 while the connections at 31 are made directly with the lever 33. The locking plate 34 has pivotally secured thereto two levers 35 and 36, the lever 35 being connected to the locking plate 34 at a point above the pivotal connection with the lever 36. The outer ends of the two levers are pivotally secured to each other and to a crank at 37. The crank is secured in the pulley 38 which has a cord secured thereto so that it may be actuated in either direction. The V-shaped spring 39 is secured at its apex to the pivot connecting the lever 36 to the plate 34 and at its outer ends it has projections which are adapted to alternately seat in the notches of the flange part of the lever 33. The movement of the pulley 38 first causes the lever 35 to tilt the plate 34 to release the end of the spring from engagement in the notch and then causes the sliding of the plate 34 and the lever 32 until the opposite end of the spring engages the other of the two notches. By this means it is possible to shift the valve guides into either of two definite positions and to alternately lock them in position.

When the valve guides are adjusted as above described, the action of the air currents is oblique with reference to the valves and there results a tendency toward lateral movement of the machine. This tendency is itself not very great, but the main advantage gained resides in the fact that the resistance to lateral movement has been eliminated. To positively provide for horizontal movement there must be one or more propellers. In the drawings are shown two propellers 40 which are driven through shafting 41 connected directly with the engine, the propellers being mounted on vertical spindles 42. Each propeller 40 has an even number of vanes, the vanes being arranged in diametrically opposite pairs and the vanes of each pair being so connected that they will always be in perpendicular planes with reference to each other. The result is that during rotation each vane will assume positions from the vertical plane to the horizontal plane, while its companion vane will at the same time pass from the horizontal position to the vertical position. The vane in its vertical position will encounter the resistance of the air, but this resistance gradually decreases to zero in the horizontal position. The two propellers 40 rotate in the opposite directions and thus cause a horizontal movement of the helicopter, the planes being reciprocated at the same time. The propellers 40 remain stationary while the helicopter is ascending and they are thrown into gear only when the valve guides have been shifted. The action of the propellers results in flight in a straight line. When turning the helicopter, it is only necessary to slow down or stop the movement of one of the propellers 40 whereat the helicopter will travel in a curved path in the same manner that a boat will travel when the oars are being used on one side only.

The lifting action is in the nature of a double acting lifting pump. One or the other of the planes is always lifting while the other plane is assuming its lifting position. The result is a continuous vertical climbing movement without appreciable jerking or jarring. In the position shown in Figure 2 the lower plane is moving downwardly and the upper plane is moving upwardly, the lower plane being the lifting plane. The valves of the lower plane are in their closed positions to resist the pressure of the air underneath, while the valves of the upper plane are in their open positions to permit the air above the plane to pass through so that the upper plane will not resist the pressure of the air to counteract the resistance in the lower plane. The position of the valves in Figure 2 is the lifting position. For horizontal flight the valves on one side of the vertical axis are shifted to their alternate position so that the movement of the air through the planes will impart an oblique thrust to the helicopter. The propellers, of course, cause the helicopter to move in other directions than vertical, but the reciprocations of the planes maintains the helicopter in vertical equilibrium during the horizontal flight and the position of the valves should be such as not to resist the horizontal movement of the helicopter.

The helicopter may be constructed of any desirable material and in any desirable dimensions without departing from the spirit of the invention. It is desirable, however, that the various parts be constructed of the lightest possible materials consistent with the required strength. For this purpose aluminium and its alloys are well adapted for giving the desired results. If the planes with the valves are constructed of aluminium, they may be built in dimensions of forty feet square and having a weight of only about ten pounds each. If given a range of vertical movement of six feet and geared for such movement in one-half of a second it is possible to operate the helicopter from a two cylinder motorcycle engine. With the movement of the planes through a distance of six feet in one-half of a second the planes will encounter an air resistance of from a pound to a pound and one-half to the square foot, which is equivalent to the resistance of wind moving at the rate of sixteen miles per hour. In other words, such a machine equipped with a two cylinder motorcycle engine would be capable of rising at the rate of sixteen miles an hour.

Having thus described my invention in such full, clear, and exact terms that its construction and operation will be readily understood by others skilled in the art to which it pertains, what I claim as new and desire to secure by Letters Patent of the United States is:

1. In a helicopter, a pair of parallel and horizontally positioned planes, means for moving said planes alternately toward and away from each other, each of said planes being provided with openings, valves for closing the openings during the downward strokes of said planes, said valves being inclined downwardly and toward the vertical axis of said helicopter when in their open positions during the upward strokes of said planes, and means for adjusting said valves so that they will all be inclined in the same direction in their open positions.

2. A helicopter having a plane, means for causing said plane to move alternately upward and downward, said plane being horizontal in all positions of its movement, said plane being provided with openings, valves pivotally secured at their edges to said plane on the under side thereof, said valves being automatically operable under the pressure of the air to close the openings in said plane during the downward stroke of said plane, said valves when in their open positions being inclined downwardly and toward the vertical axis of said helicopter during the upward stroke of said plane, and means for shifting some of said valves whereby all of said valves will be parallel to each other when in their open positions.

3. In a helicopter, a plane mounted for reciprocatory movement in vertical directions, and a plurality of slat valves pivotally secured to said plane and normally inclined thereto when they are in their opening position, some of said valves being angularly adjustable so that all of said valves may be parallel with each other or so that some of said valves may be oppositely inclined with reference to the others of said valves.

In testimony whereof I affix my signature.

HENRY A. SHUMAN.